Dec. 8, 1931. E. D. JANES 1,835,494
CARPET FASTENER AND METHOD OF ASSEMBLING SAME IN CARPETS
Filed July 1, 1931
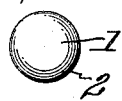
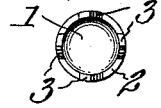
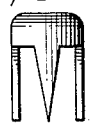
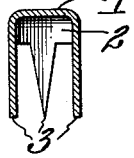
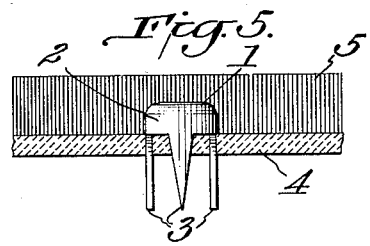
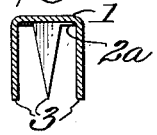
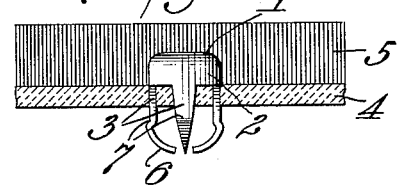
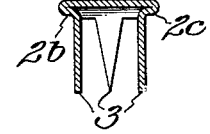
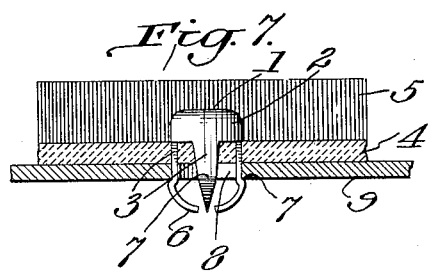
Inventor
Edmund D. Janes
by
Attorney Patented Dec. 8, 1931

1,835,494

UNITED STATES PATENT OFFICE

EDMUND D. JANES, OF WATERBURY, CONNECTICUT, ASSIGNOR TO SCOVILL MANUFACTURING COMPANY, OF WATERBURY, CONNECTICUT, A CORPORATION OF CONNECTICUT

CARPET FASTENER AND METHOD OF ASSEMBLING SAME IN CARPETS

Application filed July 1, 1931. Serial No. 548,242.

This invention relates to carpet fasteners and the method of assembling same in a carpet, and it has particular reference to a resilient stud member for carpet fasteners of the snap fastener or stud and socket type.

The object of the invention is to provide a cheap and durable resilient stud member which may be made of one piece of material and assembled in a carpet or the like without employing any auxiliary means for attaching it to the carpet.

The invention consists in a snap fastener element for carpets and the like comprising a back and a pronged skirt integral therewith, the prongs of said skirt adapted to pierce and be passed through the web of the carpet or the like and thereafter appropriately bent and shaped to produce a preferably resilient stud head and shank, said back and the head thus formed permanently securing the element to the carpet and preventing inadvertent separation of the fastener from the carpet, and the head and shank adapted for separable engagement with an appropriate socket element, all as will be explained more fully hereinafter and finally claimed.

In the accompanying drawings illustrating the invention, in the several figures of which like parts are similarly designated, Figure 1 is a back view, Fig. 2 is a face view, Fig. 3 is a side elevation, and Fig. 4 is an axial section of a fastener element embodying the principle of the invention. Fig. 5 is a fragmentary sectional elevation showing the fastener element inserted in the web of a carpet or the like. Fig. 6 is a view similar to Fig. 5 but showing the prongs of the fastener element formed to snap fastener stud head and shank shape. Fig. 7 shows the parts as in Fig. 6 with the carpet or the like arranged upon a floor or support, the head and shank of the fastener element engaging an opening in such support in snap fastener stud and socket relation. Figs. 8 and 9 illustrate, in axial section, two modifications of the form of the back and skirt of the fastener element.

Referring to the form of the invention illustrated in Figs. 1 to 7, inclusive, it will be seen that same includes, in a one piece structure, a back 1 having an offstanding skirt 2 provided with relatively long prongs 3. Although the device is shown as provided with four of the prongs 3, it will be understood that there may be more or less, as desired.

In Fig. 8 the back 1 has its inner surface substantially coincident with the edge of the skirt 2a but the other characteristics of the device, including its prongs 3 are substantially the same as previously described.

In Fig. 9 the skirt 2b is curled in to provide a circumferential flange 2c which gives a greater bearing surface for the back 1 upon the web of the carpet or the like.

The method of assembling the fastener elements in a carpet or the like is as follows:— One of the devices is arranged in the carpet at each predetermined point at which it will register with a complemental socket element in the floor or support to which the carpet is to be attached. The prongs 3 of the elements are pressed through the carpet web 4 until the edges of their skirts 2 abut against the web, as shown in Fig. 5. With the fastener elements thus arranged it will be seen that their backs 1 are substantially enclosed and concealed by the pile 5 of the carpet, it being understood that the diameter of the elements is relatively small and that they therefore displace very little of such pile upon their insertion.

The prongs 3 which, as stated, extend through the carpet web 4, are then upset or otherwise formed by proper tools to produce an enlarged head 6 and a shank, the extent of the head being defined by a shoulder 7 (see Fig. 6) adapted to engage a suitable socket element such a hole 8 in a floor panel 9.

This treatment of the prongs 3 provides a fastener stud element having a resilient head and shank, it being understood, of course, that the prongs are of such temper as to provide the desired resiliency.

It will be apparent that when the prongs 3 have been thus shaped it will be impossible for the fastener element to become detached from the carpet or the like inadvertently.

The foregoing description of the invention is confined largely to the application of the fastener elements to a carpet, but it will be understood that the intention is not to so limit it as these fastener elements may be employed in a variety of other conceivable installations where it is desired to attach an article to a backing or support.

It is known that fastening devices and parts thereof substantially of the form illustrated in Figs. 1 to 4 inclusive have been made heretofore. It is known, also, that snap fastener stud elements have been made which in their completed form have substantially the characteristics of the fastener as shown in Figs. 6 and 7. It is believed to be novel, however, to provide a fastener element of the type shown having prongs adapted to pierce and be passed through a carpet or other article and thereafter bent or shaped to stud head and shank form, as specified.

Various changes and modifications in the formation and method of application of the fastener element are considered as within the spirit of the invention and the scope of the following claims.

What I claim is:

1. A fastener assembly, including a fastening device having relatively straight prongs to pierce the article to which applied and pass through such article, said prongs after their passage through the article being bent to provide a snap fastener element and to permanently secure such element to such article.

2. A fastener assembly, including a fastening device having a back provided with relatively straight prongs to pierce the article to which applied and pass through such article, said prongs after their passage through the article being bent to provide a snap fastener stud element and to permanently secure such element to such article.

3. A fastener assembly, including a fastening device having a back provided with relatively straight prongs adapted to pierce and pass through an article, said prongs after their passage through the article being bent outwardly and thereby permanently securing the device to such article and providing a resilient snap fastener stud element.

4. A fastener assembly, including a fastening device having a back provided with relatively straight prongs to pierce and pass through an article, said prongs after their passage through the article being bent outwardly to permanently secure the device to such article and to provide the resilient head and shank of a snap fastener stud element.

5. A method of assembling a pronged fastener element in a carpet or like article, to provide a stud element for engagement with a complemental socket, which comprises causing the prongs of said element to pierce through said article so that they project from one face thereof, and thereafter outwardly bending said prongs to produce a headed stud.

6. A method of assembling a pronged fastener element in a carpet or like article, to provide a stud element for engagement with a complemental socket, which comprises causing the prongs of said element to pierce through said article so that they project from one face thereof, and thereafter outwardly bending said prongs to produce a resilient stud head and shank.

In testimony whereof I have hereunto set my hand this 30th day of June A. D. 1931.

EDMUND D. JANES.